United States Patent [19]
Davis

[11] 4,112,919
[45] Sep. 12, 1978

[54] WINDOW SOLAR HEATING UNIT

[76] Inventor: Edwin J. Davis, 2329 W. 2nd, Davenport, Iowa 52802

[21] Appl. No.: 805,915

[22] Filed: Jun. 13, 1977

[51] Int. Cl.² .............................................. F24J 3/02
[52] U.S. Cl. ..................................... 126/270; 237/1 A
[58] Field of Search ................ 126/270, 271; 237/1 A

[56] References Cited

U.S. PATENT DOCUMENTS

| | | | |
|---|---|---|---|
| 246,626 | 9/1881 | Morse | 126/270 |
| 2,931,578 | 4/1960 | Thompson | 126/270 |
| 3,946,720 | 3/1976 | Keyes et al. | 237/1 A |
| 4,054,125 | 10/1977 | Eckels | 237/1 A |
| 4,068,652 | 1/1978 | Worthington | 126/270 |

FOREIGN PATENT DOCUMENTS 276,788  11/1965  Australia .................................. 126/270

*Primary Examiner*—Carroll B. Dority, Jr.
*Attorney, Agent, or Firm*—Glenn H. Antrim

[57] ABSTRACT

The unit may be mounted either in a window or between the studs of a building that is to be supplied with solar heat. The bottom of the unit extends farther from the building than the top and is wider than the top of the unit such that the transparent side away from the building has an arcuate form and is gradually flared outwardly in a downward direction to increase the exposure to the sun during the day. A plurality of absorptive tubes within the unit are slanted from the upper portion of the unit downwardly and outwardly to the front arcuate portion of the bottom. Openings between the unit and the building are provided for air flow, and a thermostatically controlled fan is mounted in one of the openings. A baffle is mounted between the absorptive tubes and the mounting side of the solar heating unit, and the surfaces of the baffle and the absorptive tubes are painted a dull black for absorbing heat transmitted from the sun through the transparent, slanting side.

1 Claim, 5 Drawing Figures

WINDOW SOLAR HEATING UNIT

BACKGROUND OF THE INVENTION

This invention relates to solar heating devices to be attached to the sides of buildings and particularly to devices having absorptive tubes that are exposed to the sun and through which air from the respective buildings are circulated.

In U.S. Pat. No. 2,931,578, issued to D. L. Thompson on Apr. 5, 1960, a solar heating device includes the use of a storm window of the type that is supported by a pair of hinges at the top and hangs over upper and lower double-hung windows. The bottom of the storm window is positioned outwardly while being supported by its hinges, and the sides of a solar heating chamber below the window consists of the storm window, a bottom panel and a pair of triangular side panels extending from the bottom and sides of the storm window to the building to which the storm window is attached. The top window of the double-hung windows is lowered a short distance, and the lower window is raised about the same amount to permit heat from the chamber to circulate through the building. Other proposed solar heating units have boxes that are to be attached to a window or a side of a building and use various kinds of transparent material over the side of the box facing the sun and flat surfaces of absorptive material behind the transparent side for receiving radiant energy from the sun.

SUMMARY OF THE INVENTION

The solar heating unit of this invention has an inner side that can be mounted over a window or at any position on the side of a building where intake and outlet openings are made. The side of the solar heating unit facing away from the building is transparent and is slanted to face in an upward direction for transmitting heat from the sun to a chamber. The other two sides of the heating unit that are adjacent the inner side and the transparent side, are generally triangular but are flared outwardly such that the width of the transparent side becomes gradually greater toward the bottom of the unit for increasing the area exposed to the sun. The inner side of the heating unit has upper and lower openings through which air from the building is circulated through the chamber of the solar heating unit for absorbing heat derived from the sun. A plurality of absorptive tubes within the chamber are spaced apart and slanted upwardly to expose their walls to radiant solar energy transmitted through the adjacent transparent side. The circulating air flows through the tubes to transfer efficiently heat from the sun to the interior of the building.

DESCRIPTION OF THE PREFERRED EMBODIMENT

Figure 1:
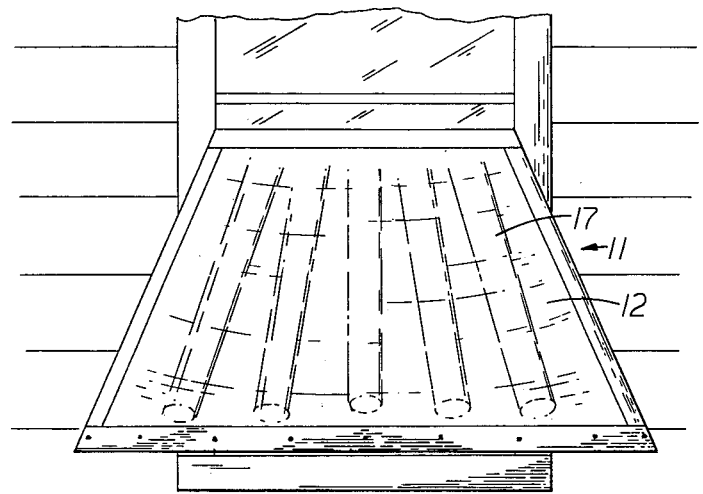
FIG. 1 shows a solar heating unit mounted in a double-hung window as viewed from outside of a house.
Figure 2:
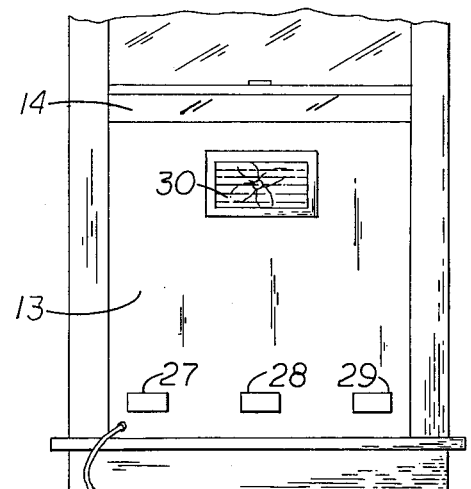
FIG. 2 shows a heating unit as viewed obliquely from one side.
Figure 3:
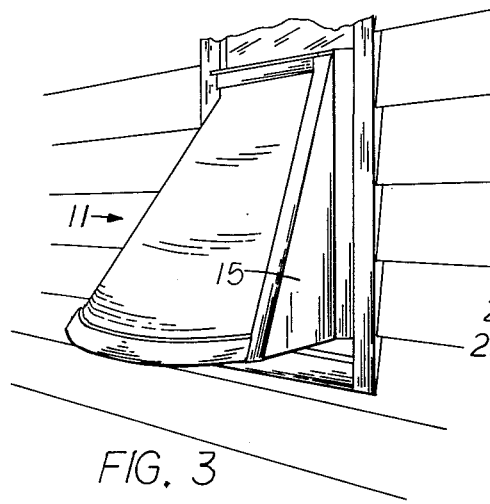
FIG. 3 shows the solar heating unit as viewed from inside the house.
Figure 4:
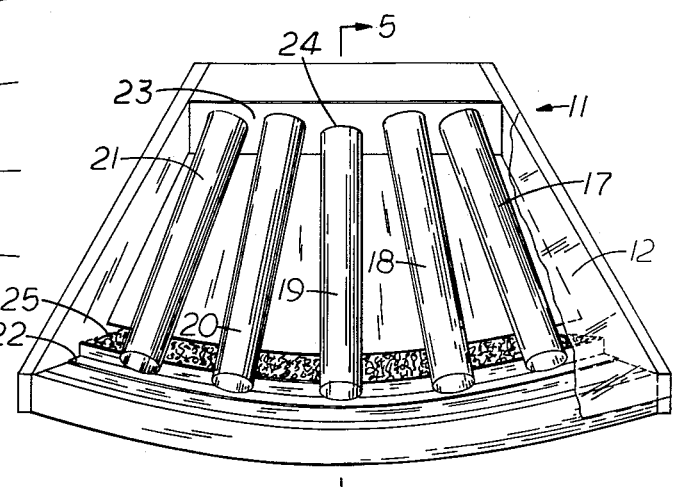
FIG. 4 shows the heating unit as viewed from outside with a transparent cover removed to show absorptive tubes.
Figure 5:
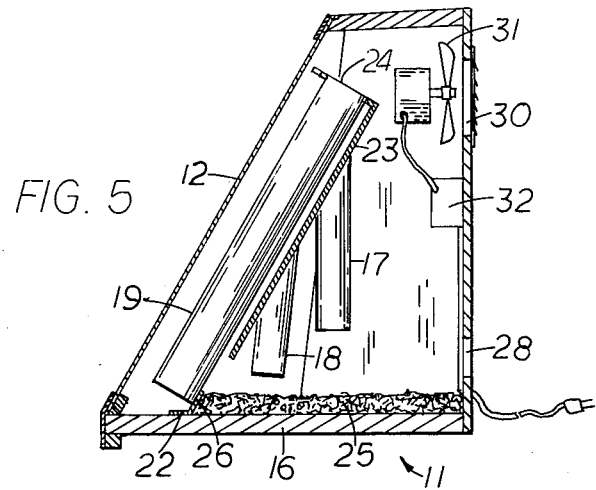
FIG. 5 is a cross-sectional view taken through the middle of the heating unit on line 5—5 of FIG. 4.

With reference to FIGS. 1-3, the solar heating unit of this invention is mounted in a lower portion of a frame of a double-hung window in somewhat the same manner as a window air conditioner is mounted. An outer transparent side 12 is mounted at an angle to be exposed to the sun. Preferably, the front edge of a bottom panel 16 shown in FIG. 5 is arcuate to have a large area of the transparent side exposed to the sun. An inside or mounting side 13 of the solar heating unit 11 may be mounted as shown in FIG. 2 within the lower opening of a frame of a double-hung window, the lower window 14 being raised. A chamber below the transparent side 12 is enclosed by sides 15 adjacent the transparent side 12 and the mounting side 13; the sides 15 are generally triangular as shown in FIG. 3 and are flared outwardly to provide gradually increasing width of the transparent side 12 in a slanting, downward direction. Absorptive tubes 17-19 shown in FIG. 4 are spaced apart and mounted in a slanting direction adjacent the transparent side 12.

The sides 13 and 15 and the bottom 16 are preferably made of polyurethane foam or of rigid, lightweight polystyrene more commonly know by the trademark Styrofoam. Should the sides and the bottoms be fabricated from metal, insulation should be applied to their inside surfaces. An arcuate metal strip 22 is positioned on the bottom 16 at a short distance from the front edge of the bottom. A metal tab 26 (FIG. 5) extending slantingly upwardly from the strip 22 where the bottom of each of the tubes 17-21 is to be located, is attached to the lower end of the respective tube, and the upper end of each of the tubes terminates in a respective opening 24 in a baffle 23.

The baffle 23 comprises a formed plate of metal having its lateral edges at least at the upper portions of the baffle attached to adjacent sides 15. The upper end of the baffle 23 is approximately perpendicular to the tubes 17-21 and just below openings 24 is turned at a right angle and formed to provide a lower portion spaced a short distance back of the tubes 17-21. The lower edge of the baffle 23 is about 15 cm. from the bottom of the unit to provide space for circulation of air. The tubes 17-21 have a diameter of about 3 inches (7.6 cm), and the tubes and the baffle 23 are painted dull black to provide maximum absorption of radiant energy. The upper portion of the baffle 23 that is substantially perpendicular to the axes of the tubes 17-21 has spaced openings 24 for receiving the upper ends of the tubes.

Preferably, the openings 24 are not in a straight line but are at different levels to provide slightly different slopes of the tubes 17-21. For example, in the northern hemisphere, where the solar heating unit is usually mounted on the south side of a building, the center tube 19 has its upper end in the lowest position so that the axis of the tube 19 tends to be perpendicular to the direction of radiation of the sun at noon; whereas, the tubes 18 and 20 nearer to respective opposite sides of the heating unit have openings at a higher level to receive more directly radiant energy from the sun in the morning and in the afternoon respectively. The tubes are staggered so that the shadow of any tube does not fall on another for any positions of the sun. In order to provide continuation of heat for a short interval while a cloud is passing, gravel 25 or other heat retentive material may be placed over the bottom 16 of the solar heating unit 11.

With reference to FIG. 2, the mounting side 13 has across its lower portion a plurality of small openings 27-29, for example, three openings that are 2 inches (5.1 cm) high and 4 inches (10.2 cm) wide, and a larger opening 30 centered in the upper portion for air flow between the building and the chamber of the solar heating unit 11. A fan 31 (FIG. 5) is mounted in the opening 30 in a usual manner to increase the circulation between the building and the chamber of the solar heating unit 11. The fan 31 may be installed to impel air either inwardly or outwardly through the opening 30, but preferably the air will be impelled inwardly through the opening 30 and outwardly through the lower openings 27-29 to direct heat near the floor of a building. The wiring of the motor for the fan 31 is connected through a thermostat 32 to operate the fan whenever the temperature in the chamber of the solar heating unit 11 is a predetermined amount higher than the desired temperature of the air within the building to which the unit is attached.

In a typical installation, the thermostat 32 is set at 110° F. (43.3° C.), and in fairly cold weather during a sunny day, the fan operates from about 9:30 A.M. to 4:00 P.M. When the fan 31 operates to impel the air downwardly within the chamber of the solar heating unit 11 as in a counterflow furnace, the air from the building is drawn into the chamber through the opening 30, flows downwardly through the absorptive tubes 17-21, over the surface of the baffle 23 and any heat retentive materials 25, and through the openings 27-29 to the interior of the building to which the unit is attached. Although the solar heating unit 11 has been described as being a window unit, it can be mounted to the side of a building where corresponding openings into the building are made for the openings 27-30. The portion of the solar heating unit 11 that is attached to the building may have the proper width to fit between the studs of the wall of the building, and a plurality of units may be mounted side by side or one over the other.

I claim:

1. A solar heating unit comprising:

a chamber having a mounting side to be attached to a building, an opposite transparent side to be exposed to the sun, and a bottom with an outer edge that is bowed outwardly; said mounting side having upper and lower openings through upper and lower portions respectively of the mounting side to permit flow of air between said chamber and the building to which said solar heating unit is attached, said transparent side facing slantingly upwardly for exposure to the sun, a baffle plate having a slanting portion substantially parallel with said transparent side and an upper portion laterally across said chamber in proximity to said upper opening, said slanting portion to said baffle plate and said transparent side being spaced apart to define a heating space therebetween and each being bowed and gradually flared outwardly in a downward direction, a lower edge of said slanting portion of said baffle being above said bottom to provide a passageway between the bottom of said heating space and said lower opening, a plurality of absorptive tubes, said upper portion of said baffle plate having an opening for each of said absorptive tubes, said absorptive tubes having respective upper ends positioned within respective ones of said openings through said baffle plate, said absorptive tubes extending from said respective openings downwardly and outwardly within said heating space and having respective open lower ends approximate said passageway that communicates with said lower opening, different ones of said openings through said upper portion of said baffle plate being at different distances from a lateral edge of said upper portion of said baffle plate to provide different slants to said respective absorptive tubes and thereby to position walls of different ones of said absorptive tubes nearly perpendicular to the direction of the sun at different times of the day, and said upper ends of said absorptive tubes communicating through partitioned space above said upper portion of said baffle to said upper opening through said mounting side.

* * * * *